United States Patent [19]

Mariasi et al.

[11] 4,258,163

[45] Mar. 24, 1981

[54] PARTIALLY SAPONIFIED POLYVINYL ACETATES AND THEIR APPLICATION IN THE HOMO- AND COPOLYMERIZATION OF VINYL CHLORIDE

[75] Inventors: Bela Mariasi; Laszlo Molnar; Janos Toth; Imre Gulya, all of Kazincbarcika; Miklos Nagy; Ervin Wolfram, both of Budapest; Miklos Zrinyi, Erd; Gaborne Kovacs; Laszlone Jaksity, both of Budapest, all of Hungary

[73] Assignee: Borsodi Vegyi Kombinat, Kazincbarcika, Hungary

[21] Appl. No.: 41,626

[22] Filed: May 23, 1979

Related U.S. Application Data

[63] Continuation-in-part of Ser. No. 762,963, Jan. 27, 1977, abandoned.

[30] Foreign Application Priority Data

Jan. 28, 1976 [HU] Hungary .............................. BO 1595

[51] Int. Cl.$^3$ ................................................ C08F 2/20

[52] U.S. Cl. ................................... 526/202; 521/109; 521/117; 525/56; 525/61; 525/62; 526/344

[58] Field of Search ................. 526/202; 521/109, 117

[56] References Cited

U.S. PATENT DOCUMENTS

| | | | |
|---|---|---|---|
| 2,812,318 | 11/1957 | Kraeger et al. | 526/202 |
| 3,444,125 | 5/1969 | Schimelpfenig et al. | 526/8 |
| 3,592,800 | 7/1971 | Oschmann et al. | 526/202 |
| 3,929,753 | 12/1975 | Itoh et al. | 526/202 |

Primary Examiner—Stanford M. Levin

[57] ABSTRACT

This invention relates to novel partially saponified polyvinyl acetates with a degree of hydrolysis of 30 to 65 mole % which might be considered as vinyl alcohol-vinyl acetate block copolymers. The invention relates further to the application of said novel block copolymers as a pore-forming additive used together with at least one known protective colloid in the homo- and copolymerization of vinyl compounds, primarily of vinyl chloride in a pure aqueous medium.

3 Claims, 1 Drawing Figure

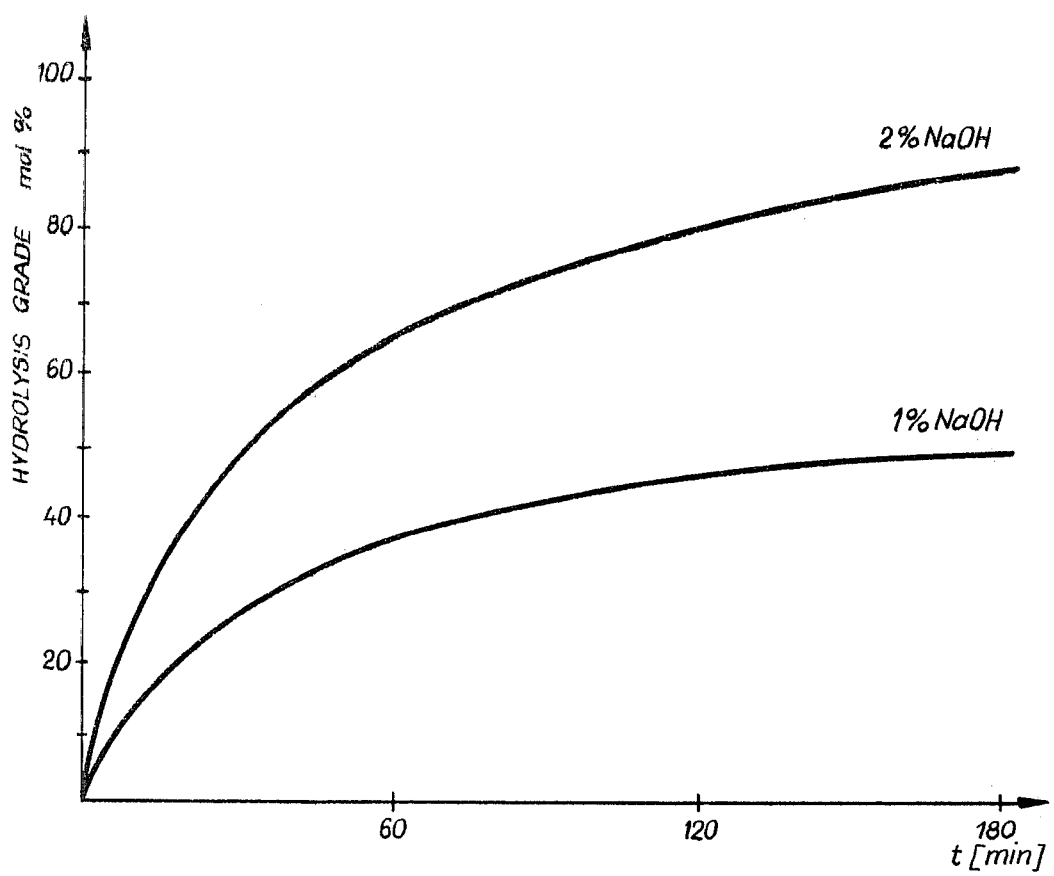

PARTIALLY SAPONIFIED POLYVINYL ACETATES AND THEIR APPLICATION IN THE HOMO- AND COPOLYMERIZATION OF VINYL CHLORIDE

CROSS REFERENCE TO RELATED APPLICATION

This application is a continuation-in-part of U.S. Ser. No. 762,963 filed on Jan. 27, 1977, now abandoned.

DESCRIPTION OF PREFERRED EMBODIMENTS

According to the present state of technology a single partially saponified polyvinyl acetate is known in the above range of the degree of hydrolysis and this product has a statistical structure, that is it contains hydroxyl and acetate groups in random distribution. This material is the product Polivic S-202 of the Italian firm Sigma which is recommended as a porosity increasing additive in the suspension polymerization of vinyl chloride. The porosity increasing additive Polivic S-202 when applied together with known primary dispersing agents—such as the usual protective colloids, e.g., polyvinyl alcohol and cellulose ether products—improves, if fact, considerably the porosity of the PVC powder formed compared to the porosity of the product manufactured without said additive but the granular structure and morphology of the PVC powder cannot be regarded as optimal because the increased porosity is accompanied by a decrease of the bulk density and thus by a lower performance of the processing machinery.

It has been discovered that it is possible to prepare by means of alkali catalyzed saponification of controlled rate performed in the gel phase in a solvent mixture partially saponified polyvinyl acetates which differ from the partially saponified polyvinyl acetates known according to the present state of technology inasmuch as on the polymer chain of said polyvinyl acetates the hydroxyl and acetate groups are situated in separate blocks. The difference in structure is proved by the fact that these partially saponified polyvinyl acetates of a degree of hydrolysis of 30 to 65 mole% and a degree of polymerization of about 100 to about 6000, preferably about 300 to 3000 prepared in the gel phase form in a water-propanol solvent mixture in the presence of an acid catalyst a gel with bifunctional aldehydes (e.g. with glutaric aldehyde) usually within one hour, while the known partially saponified polyvinyl acetate of a similar degree of hydrolysis (i.e. Polivic S-202) forms under similar conditions a gel not sooner than 24 hours after having been treated with said bifunctional aldehyde but said gelation may be attributed to the removal of further acetate groups by said acid catalyst during said length of time causing a disruption of the statistical arrangement of the hydroxyl groups whereby all hindrance in the way of the formation of acetal links with the bifunctional aldehyde is removed.

When the partially saponified polyvinyl acetates of the present invention were used in the aqueous polymerization of vinyl chloride together with known protective colloids such as for instance polyvinyl alcohol or cellulose ether products, a hitherto unknown, surprising technological, surplus effect was observed. This technological, surplus effect consists in considerably increased porosity and at the same time significantly higher bulk density of the PVC powder manufactured without additive; with said additives a PVC powder of optimum granular structure which is easy to process is obtained. When the known additive Polivic S-202 is used as already mentioned a product of higher porosity but of lower bulk density is obtained.

The alkali catalyzed saponification of controlled rate performed in gel phase which leads to the partially saponified polyvinyl acetates of the invention is performed in the gel phase in a solvent mixture consisting of minimum 50 v% and maximum 98 v% of at least one non-polar organic solvent, and at least one polar organic solvent taken to make up the volume to 100 v% and in this solvent mixture minimum 5 w/v% and maximum 60 w/v% of polyvinyl acetate of appropriate degree of polymerization, further minimum 0.1 w/v% and maximum 10 w/v% of at least one alkali metal and/or alkaline earth metal hydroxide are dissolved.

According to one preferred embodiment, the process of the invention proceeds by preparing from a polyvinyl acetate of appropriate degree of polymerization either with a pure non-polar solvent or with the mixture of two or more such solvents within the concentration limits mentioned in the preceeding paragraph a polymer solution and to the solution obtained in this way the solvent of the other type is added in such a proportion that the ratio of polar to non-polar solvents in the mixture shall also be within the limits given in the preceding paragraph. Of course we might proceed by dissolving the polymer in the mixture of the two types of solvents; the order of the operations is not critical. Next the calculated amount of the alkaline catalyst is added, either as a solid or dissolved in the polar solvent(s), to the polymer solution. This is followed by a short homogenization after which the system is allowed to stand. Depending upon the temperature, the concentration of the polymer the system is converted into a gel within a short time, usually between 5 and 20 minutes and the desired saponification proceeds in the gel phase formed in this way.

In the preparation of the partially saponified polyvinyl acetates of the invention, the non-polar solvents commonly applied are, for example, aromatic organic solvents, aliphatic hydrocarbons or halogenated aliphatic hydrocarbons or mixtures thereof. In this way benzene, the mixture of benzene and xylene, of toluene and xylene or of toluene and petrol as well as of benzene and chloroform might preferably be used. It is preferred to use alcohols as the polar solvent, preferably aliphatic alcohols with short carbon chains, for instance methanol, ethanol or propanol or the mixture thereof.

Of the hydroxides of the alkali metals and/or of the alkaline earth metals to be applied as catalyst preferably sodium hydroxide is used, but other easily accessible hydroxides of the alkali metals or of the alkaline earth metals, such as e.g. potassium hydroxide or calcium hydroxide might also be used. Saponification should be preferably carried out at a temperature between 10° C. and 80° C.

BRIEF DESCRIPTION OF THE DRAWING

The process of saponification taking place in the gel phase is illustrated by the FIGURE shown on the attached sheet. From this FIGURE it becomes clear to all those skilled in the art that a product of any desired degree of hydrolysis can be prepared by the appropriate choice of the concentration of the alkali (the percentage values along the curves show the concentration of the alkali) and/or by the neutralization of the alkali (for instance by adding hydrochloric or acetic acid) at an adequately chosen moment.

The partially saponified polyvinyl acetates of the invention possess a new property not found in the partially saponified polyvinyl acetates of similar composition known at the present state of technology and thanks to this property the partially saponified polyvinyl acetates of the invention can be unambiguously distinguished from other similar products.

This already mentioned new property is the block-like distribution of the residual acetate groups along with polymer chain. This is proved by the fact that the partially saponified polyvinyl acetates of the invention form within a short time gels with bifunctional aldehydes, in contrast to the partially saponified polyvinyl acetates of similar composition known at the present state of technology which form within the same time only viscous solutions with the very same bifunctional aldehydes; that is, the partially saponified polyvinyl acetates of the invention form gels always within a shorter period of time with bifunctional aldehydes than the known polyvinyl acetates of the same acetate content (that is polyvinyl acetates with a structure of statistical distribution).

The test with the bifunctional aldehyde is carried out as follows: If the average degree of polymerization $\overline{P}$ of the partially saponified polyvinyl acetate under investigation is above 500, a 5% and, if it is below 500, a 10% solution is prepared in the mixture of 40 v% of propanol and 60 v% of water. If $\overline{P} > 500$ 0.9 cm$^3$ and if $\overline{P} < 500$ 1.8 cm$^3$ of a 25% glutaric aldehyde solution and in both cases 0.1 cm$^3$ of a concentrated hydrochloric acid solution are added to 10 cm$^3$ of the solution of the partially saponified polyvinyl acetate and the thus-obtained mixture is shaken rapidly and thoroughly. The solution is allowed to stand and inspected after an hour. During this period a partially saponified polyvinyl acetate of the invention has formed a tough elastic gel, while the known product of similar composition (i.e. Polivic S-202) has remained a viscous solution.

The partially saponified polyvinyl acetates of the invention can be applied particularly advantageously to the stabilization of water-in-oil type emulsions; they are capable of stabilizing emulsions of a relatively uniform drop-size distribution practically up to indefinite drop stability almost independently of the chemical quality of the materials immiscible with water. The partially saponified polyvinyl acetates of the invention can be used advantageously in the plastic manufacturing and processing industries, in the pharmaceutical industry, in the food industry as well as in the manufacture of cosmetics and of plant protecting agents. The use of the partially saponified polyvinyl acetates of the invention is particularly advantageous as a pore-forming additive in the aqueous homo- and copolymerization of vinyl compounds, particularly of vinyl chloride.

It is known that when vinyl chloride is homopolymerized in suspension protective colloids, for instance cellulose ethers, polyvinyl alcohol, further an alkali metal salt of the copolymer of 1 mole of styrene or of 1 mole of vinyl acetate with 1 mole of maleic anhydride (see Houben-Weyl; Methoden der organischen Chemie, Vol. 14, p. 881), are used to stabilize the suspension.

However, when protective colloids of the above type are used no products of a porous granular structure can be obtained under the usual conditions of suspension polymerization. Though under special polymerization conditions (such as the application of certain types of cellulose ethers and intensive agitation at a temperature below 58° C. in an alcohol-water media) the preparation of a powdery product of porous granular structure might be solved, the granular structure of these powdery products cannot be considered as optimal.

It is further known that the porosity of said powdery products can be improved by applying in addition to the usual protective colloids bi- or multivalent metal salts of alkyl sulphonates and/or sulphates (see e.g. U.S. Pat. Nos. 3,706,705 or 3,057,831 and British Pat. No. 902,083) or partial fatty acid esters of polyhydroxy compounds (see e.g. U.S. Pat. No. 3,205,204, 3,340,243 or 3,390,142. The application of the above mentioned porosity improving additives has, however, the drawback that the additives impair the electric properties and thermal stability of the powdery product produced and also hinder the processing of the powdery product into a transparent endproduct.

Though the partially saponified polyvinyl acetate (Polivic S-202) known of the present state of technology when used as a porosity increasing additive in the suspension polymerization of vinyl chloride improves considerably the plasticizer uptake of the PVC powder formed without an impairment of the electric properties, it reduces bulk density of the PVC powder and thereby the performance of the processing machinery. According to our experience gathered so far increased porosity is always accompanied by a decrease of the bulk density, when using known porosity increasing additives.

When the partially saponified polyvinyl acetates of the present invention were used as pore-forming additives in the aqueous polymerization of vinyl chloride we obtained the surprising result that improved porosity was accompanied by higher bulk density and fluidity and of course also by the improvement of the processing parameters of the product. This led us to the conclusion that by means of the application of the partially saponified polyvinyl acetates of the present invention PVC particles of an optimum granular structure have been formed.

On the basis of the aforesaid the invention relates to the application of the partially saponified polyvinyl acetates of the invention as pore-forming additives with at least one known protective colloid in the homo- and copolymerization of vinyl compounds, primarily of vinyl chloride in a pure aqueous medium.

According to the present invention the polymerization is carried out by using beside 0.03 to 0.3 w% of at least one known protective colloid with reference to the weight of the monomer(s) 0.01 to 0.4 w%, preferably 0.04 to 0.2 w% of a partially saponified polyvinyl acetate of the present invention, as pore-forming additive.

The polymerization is performed otherwise in a manner known per se.

When the partially saponified polyvinyl acetates of the invention are used as pore-forming additives in the homo- and copolymerization of vinyl compounds in a pure aqueous medium the following technological surplus effects can be observed:

(a) The powdery product formed has a high plasticizer uptake (high porosity) and at the same time a high bulk density and fluidity.

(b) Because of the high bulk density and good fluidity it is possible to raise the performance of the processing machinery.

(c) The thermal stability and electric parameters of the PVC-products are not affected by the additives of the invention.

(d) The optimal granular structure improves also the processing parameters of the powdery product (rate of plasticizer uptake, gelation), hence the product can be used hard or plasticized and there is no obstacle in the way of producing transparent plastic products.

(e) In order to ensure the same average grain size it is sufficient to apply the primary dispersing agent (protective colloid) in a lower concentration with the additive of the invention rather than with other additives or alone enabling grain size distribution to be more uniform and within a narrower range.

The following non-limiting Examples illustrate the invention:

EXAMPLE 1

40 g. of polyvinyl acetate (P=500) is dissolved in 100 cm$^3$ benzene, next a mixture of 30 cm$^3$ of methanol and 50 cm$^3$ of benzene is added to the solution of the polymer in such a way that the total volume of the system shall be 200 cm$^3$. Thus the concentration of the polymer in the solution is 20 w/v% and the ratio of benzene to methanol is 5:1. Next 8 cm$^3$ of a 2 N NaOH solution is added to the mixture and the duration of hydrolysis is chosen to 50 minutes. The yield and parameters of the obtained product are:
Yield: 95%.
Degree of hydrolysis: 43 mole%.
Reaction with glutaric aldehyde: positive (a tough gel is formed within 1 hour).

EXAMPLE 2

The saponification is carried out substantially in the same manner as described in Example 1 with the difference that the reaction mixture is allowed to stand for 150 minutes. The yield and parameters of the obtained product are:
Yield: 95%.
Degree of hydrolysis: 62 mole%.
Reaction with glutaric aldehyde: positive.

EXAMPLE 3

60 g. of polyvinyl acetate ($\overline{P}$=300) is dissolved in 100 cm$^3$ of benzene, next a mixture of 42.5 cm$^3$ of methanol and 27.5 cm$^3$ of benzene is added to the solution to make a volume of 200 cm$^3$. The polymer concentration is 30 w/v%, the benzene to methanol ratio 3:1. Next 10 cm$^3$ of a 2 N NaOH solution is added to the mixture and the duration of hydrolysis is chosen to 60 minutes. The yield and the parameters of the obtained product are:
Yield: 92%.
Degree of hydrolysis: 34 mole%.
Reaction with glutaric aldehyde: positive.

EXAMPLE 4

The saponification is carried out substantially in the same manner as described in Example 3 with the difference that instead of the 10 cm$^3$ of 2 N NaOH 15 cm$^3$ of 2 N NaOH solution is used as catalyst. Reaction time is again 60 minutes. The yield and parameters of the obtained product are:
Yield: 94%.
Degree of hydrolysis: 51 mole%.
Reaction with glutaric aldehyde: positive.

EXAMPLE 5

(a) Polymerization is carried out in the following manner: 2850 g. of de-ionized water, 0.8 g. of hydroxymethyl cellulose and 1.5 g. of partially saponified polyvinyl acetate of a degree of hydrolysis of 43 mole% (prepared in Example 1) as well as 1.5 g. of a 30% di-isopropylperoxydicarbonate solution in xylene are measured into a 5 liter stainless steel reactor provided with an impeller agitator. Next 1500 g. of vinyl chloride is introduced under vacuum through a valve by means of a nitrogen cushion into the reactor. When the addition of vinyl chloride has been finished the rpm of the agitator is set at 700 and the temperature of polymerization is kept at 53° C.±0.2° C. by connecting the reactor to the water of a thermostat which forms part of the equipment. Polymerization is continued till the pressure in the reactor drops from its maximum value by 2 2 atm. (i.e. about 29 psi).

(b) The experiment described in item (a) is performed with the modification that instead of the partially saponified polyvinyl acetate of Example 1 1.5 g. of the partially saponified polyvinyl acetate with a degree of hydrolysis of 51 mole% of Example 4 is weighed into the reactor.

(c) The experiment described in item (a) is performed with the modification that instead of 0.8 g. of hydroxymethyl cellulose 1.5 g. of a known partially saponified polyvinyl acetate with a degree of hydrolysis of 78.8 mole% (e.g. the product GOHSENOL KH-17 Trade mark of the Japanese firm NIPPON) is used.

EXAMPLE 6 (for the sake of comparison)

(a) The polymerization according to item (a) of Example 5 is performed by weighing into the reactor 1.5 g. of hydroxymethylcellulose and instead of the partially saponified polyvinyl acetate prepared according to Example 1 1.5 g. of the porosity improving additive Polivic S-202.

(b) The experiment described in item (a) of Example 6 performed with the modification that instead of 1.5 g. of hydroxymethylcellulose used as protective colloid 1.8 g. of the partially saponified polyvinyl acetate used in item (c) of Example 5 is weighed into the reactor.

EXAMPLE 7 (for the sake of comparison)

(a) the experiment described in item (a) of Example 6 is performed without using the porosity improving additive Polivic S-202.

(b) The experiment described in item (b) of Example 6 is performed with the modification that no porosity improving additive is used.

The results of tests performed with the PVC powders obtained according to items (a) to (c) of Example 5, items (a) and (b) of Example 6 and items (a) and (b) of Example 7 are given in Table 1.

TABLE 1

|  |  |  |  | Particle distribution (μm) | | | | | |
|---|---|---|---|---|---|---|---|---|---|
| (1) | (2) | (3) | (4) | 0–63 | 63–90 | 90–125 | 125–160 | 160–125 | 250– |
| (5a) | 518 | 7.4 | 31.3 | 1.0 | 12.0 | 27.0 | 56.0 | 4.0 | — |
| (5b) | 512 | 7.8 | 30.7 | 3.0 | 14.0 | 28.0 | 47.0 | 8.0 | — |
| (5c) | 478 | 6.8 | 28.1 | 3.5 | 8.0 | 29.5 | 45.0 | 14.0 | — |

TABLE 1-continued

| (1) | (2) | (3) | (4) | Particle distribution (μm) | | | | | |
|---|---|---|---|---|---|---|---|---|---|
| | | | | 0–63 | 63–90 | 90–125 | 125–160 | 160–125 | 250– |
| (6a) | 452 | 5.7 | 32.1 | 7.0 | 8.0 | 65.0 | 15.0 | 5.0 | — |
| (6b) | 425 | 6.3 | 30.3 | 4.0 | 13.0 | 21.5 | 38.5 | 23.0 | — |
| (7a) | 468 | 6.5 | 27.6 | 2.5 | 8.0 | 18.5 | 56.5 | 14.5 | — |
| (7b) | 438 | 6.2 | 21.1 | 4.5 | 9.5 | 23.5 | 32.5 | 27.0 | 3.0 |

(1) Number of Example
(2) Bulk density (g./liter)
(3) Fluidity (g./cm$^2$ . sec)
(4) Plasticizer uptake (%)

EXAMPLE 8

A polymerization process was carried out as described in Example 1 of U.S. Pat. No. 2,812,318 by polymerizing 100 weight parts of methanol and 111 weight parts of water in the presence of 0.2 parts of lauroyl peroxide and 0.1 parts of a commercially available partially hydrolyzed polyvinyl acetate of a degree of hydrolysis of 45% of 49° C. during 20 hours. The properties of the thus-obtained polymer product correspond to those disclosed in said patent specification.

The above polymerization run was repeated using a totally aqueous medium, 250 weight parts of water. After the same polymerization time the obtained polyvinyl chloride formed a bulk which adhered to the wall of the reactor. It was quite difficult to remove the bulk from the reactor wall. This run clearly shows that the partially hydrolyzed polyvinyl acetates used in accordance with U.S. Pat. No. 2,812,818 are incapable of functioning as protective colloids for polymerizing vinyl chloride in a *pure aqueous medium* and therefore cannot be used for preparing powdery polyvinyl chlorides.

What we claim is:

1. A process for the homo- and copolymerization of vinyl chloride in the presence of 0.03 to 0.3 w% of at least one protective colloid, comprising in an aqueous medium using as a pore-forming additive in a quantity of about 0.01 to 0.4 weight % with reference to the weight of the vinyl chloride used a partially saponified polyvinyl acetate (vinyl acetate-vinyl alcohol copolymer) having a degree of hydrolysis of about 30 to 65 mole%, a degree of polymerization of about 100 to 6000 and having a block structure; said partially saponified polyvinyl acetate being further characterized by forming a gel with bifunctional aldehydes in an acid catalyzed reaction within a shorter period of time than needed for the formation of a gel under identical conditions from a partially saponified polyvinyl acetate of identical acetate content having a structure of statistical distribution.

2. A process as claimed in claim 1, wherein the partially saponified polyvinyl acetate is prepared by way of alkali catalyzed saponification, wherein the saponification is performed in the gel phase in a mixture containing minimum 50 volume % and maximum 98 volume % at least one non-polar organic solvent to make up the volume to 100% and minimum about 5 w/v% and maximum about 60 w/v% of polyvinyl acetate of appropriate degree of polymerization, further a minimum of about 0.1 w/v% and a maximum of about 10 w/v% of at least one hydroxide of an alkali metal and/or of an alkaline earth metal is dissolved.

3. A process as claimed in claim 2, characterized in that the saponification is carried out at a temperature between about 10° C. and about 80° C.

* * * * *